United States Patent [19]

Finger

[11] 4,368,757
[45] Jan. 18, 1983

[54] CLEANING APPARATUS AND METHOD

[75] Inventor: John F. Finger, Beresford, S. Dak.

[73] Assignee: Sioux Steam Cleaner Corporation, Beresford, S. Dak.

[21] Appl. No.: 191,838

[22] Filed: Sep. 29, 1980

[51] Int. Cl.³ .............................................. B08B 3/00
[52] U.S. Cl. .................................. 137/565; 137/893; 137/895; 134/100
[58] Field of Search ................... 137/565, 893, 895, 3, 137/541, 528; 134/100, 101; 417/151; 239/310

[56] References Cited

U.S. PATENT DOCUMENTS

| | | | |
|---|---|---|---|
| 1,013,158 | 1/1912 | Hahn | 137/541 |
| 2,588,255 | 3/1952 | Larsh | 137/893 X |
| 2,949,931 | 8/1960 | Ruppright | 137/528 |
| 3,135,288 | 6/1964 | Leisenheimer | 137/553 |
| 3,257,180 | 6/1966 | King | 137/895 X |
| 3,595,268 | 7/1971 | Archer | 137/565 |
| 3,651,830 | 3/1972 | Kollmai | 137/565 |
| 3,773,065 | 11/1973 | Mattox | 239/304 |

FOREIGN PATENT DOCUMENTS

| | | | |
|---|---|---|---|
| 229012 | 4/1958 | Australia | 137/895 |
| 501193 | 10/1976 | Bulgaria | 417/151 |

Primary Examiner—A. Michael Chambers
Attorney, Agent, or Firm—Merchant, Gould, Smith, Edell, Welter & Schmidt

[57] ABSTRACT

Pressure cleaning apparatus comprising a pair of liquid containers at substantially the same level, including a water container (11) and a detergent container (12), a positive displacement pump (14) located below said liquid containers and having an inlet and an outlet, and an aspirator mixer (13) for supplying a mixture of water and detergent to the pump, comprising an outer tube (60) having first and second ends and a lateral inlet connection (42) near the first end, an inner tube (47) projecting into the outer tube in sealed relation to the first end, and having a first end extending past the lateral inlet, piping connecting (41) the second end of the outer tube to the inlet of the pump, connecting (48, 49, 32) the inner tube to the bottom of the detergent container, and connecting (43, 44, 45, 30) the lateral inlet to the bottom of the water container, slow operating check valve mechanism (63, 64, 65) operative to prevent continuous flow of liquid from the water container to the liquid container, and spring bias check valve mechanism (50-58) for preventing flow of detergent into the water container.

10 Claims, 3 Drawing Figures

FIG. 3

CLEANING APPARATUS AND METHOD

TECHNICAL FIELD

This invention relates to the field of pressure cleaners for discharging a cleaning liquid under pressure from a suitable nozzle to impact on the work being cleaned.

BACKGROUND OF THE INVENTION

There are many occasions in which the need occurs to deliver a stream or jet of liquid at high pressure for cleaning an object such as an automobile, or an engine. The liquid is usually water, mixed with a detergent appropriate to the situation in a desired ratio. It is convenient to provide containers for water and detergent in liquid form, from which the liquids are drawn by a pump through a mixing arrangement, for delivery to the spray nozzle. The water container is usually provided with a float valve for maintaining its level substantially constant. The detergent container is usually replenished from time to time, since a far smaller volume of detergent is used than of water: the level of detergent liquid is therefore not constant. In the washing procedure the pump is turned on and off: such pumps are subject to damage by cavitation which occurs each time the pump starts without full fluid input. The mixing arrangement is typically an aspirator, and if the pressure heads in the two containers are not the same, the mixture ratio departs from that desired. It sometimes happens that detergent liquid finds its way into the water container, to contaminate the water, during periods when the system is not in use, which is undesirable.

BRIEF SUMMARY OF THE INVENTION

The present invention provides an arrangement whereby the inlet to the pump is always flooded to prevent cavitation, the liquid levels in both the containers remain substantially constant, and no possibility exists of contamination of the water by detergent. This is accomplished by providing a pair of check valves in association with the mixer, of special characteristics, one being provided with a very small closing spring and the other being a float disk check valve, the latter being a part of the mixer itself and the former being located between the mixer and the water container.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing, in which like reference numerals indicate corresponding parts throughout the several views, FIG. 1 is a somewhat schematic showing of a cleaning system according to the invention, and FIGS. 2 and 3 are fragmentary sectional views taken along the lines 2—2 and 3—3 of FIG. 1, respectively.

DESCRIPTION OF THE PREFERRED EMBODIMENT

A cleaning system according to the invention is shown to comprise a pair of liquid containers 11 and 12, a mixer 13, and a constant displacement pump 14 for delivering liquid through a conduit 15 to a utilization nozzle or gun not shown. Containers 11 and 12 may be a common unit separated by a liquid-tight partition 16 and provided with a hinged cover 17.

Container 11 is for fresh water 20, which is supplied from a conduit 21 under the control of a float valve 22 to maintain liquid in the container at the level 23.

Container 12 is for liquid detergent 24, and should be positioned for convenient opening of cover 17 to replenish the supply of liquid.

A first coupling 30 is welded into a punched hole in the bottom of container 11, to threadedly receive a strainer assembly 31, and a like coupling 32 and strainer 33 are provided in the bottom of container 12.

Mixer 13 has an inwardly tapering outlet connection 40 connected to pump 14 by a conduit 41, a lateral water inlet connection 42 connected by a conduit 43, a first check valve 44, and a conduit 45 to coupling 30 of container 11, and a detergent inlet connection 46 connected by a conduit 47, a metering or shut-off valve 48, and a conduit 49 to coupling 32 of container 12.

Figures 1, 2, 3:
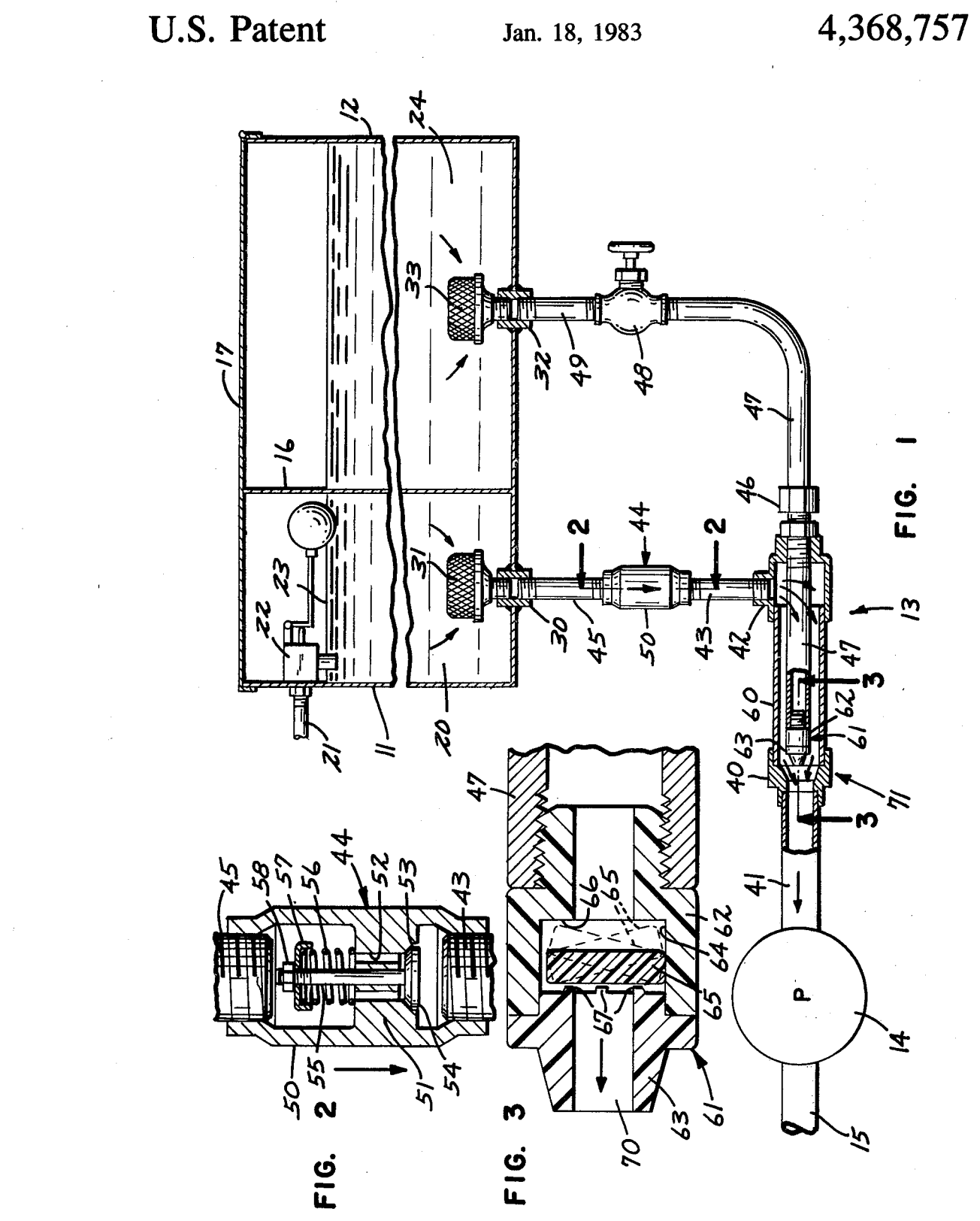

Check valve 44 is shown in FIG. 2 to comprise a body 50 having a central transverse partition 51 with an axial bore 52 provided with a seat 53 for a valving disk 54. A pin 55 projects from disk 54 through bore 50 and through a light compression spring 56 bearing at one end against partition 51 and at the other end against a cup washer 57 secured on pin 55 by a nut 58.

Conduit 47 is continued axially as an inner tube within the body or outer tube 60 of mixer 13 to terminate at a check valve 61, of the type known as a float disk check valve, better shown in FIG. 3 to comprise a seat member 62 and a nozzle member 63, which cooperate to define a chamber 64 for a float disk 65. Disk 65 can engage a shoulder 66 of seat member 62 to prevent flow of liquid from nozzle member 63 to conduit 47, but the nozzle member has a number of bosses 67 around its central aperture 70 to allow passage of liquid from conduit 47 to the nozzle even though the disk is thereby brought into contact with the nozzle member. Disk 65 is very light and its movement in chamber 64 has a "wobbling" characteristic suggested by the broken lines in FIG. 3.

Nozzle member 63 and outlet connection 40 cooperate with mixer body 60 to comprise an aspirator 71, so that the flow of water past the nozzle member to the pump entrains some of the liquid detergent supplied by conduit 47. If desired, connection 46 may be a sleeve joint to enable adjustment of the position of nozzle member 63 in connection 40.

OPERATION

To perform a washing operation with the system disclosed, conduit 21 is connected to a source of water which flows into container 11 to a level 23 under the control of float valve 22. Liquid detergent is placed in container 12 to generally the same level, and valve 48 is opened to a desired extent. Water and detergent flow into mixer 13 through check valve 44 and metering valve 48 respectively, but since the liquids are at basically the same level there is no tendency of either liquid to flow toward the container of the other liquid. Inlet conduit 41 to pump 14 fills with liquid and remains full of liquid as long as there is liquid in either container 11 or container 12.

Now when operation of pump 14 is initiated a large flow of water is drawn through mixer 13, entraining a small volume of detergent which displaces disk 65 against bosses 67. The level of water 20 in container 11 is maintained by float valve 22, but the level of detergent 24 in container 12 begins to fall. When operation of pump 14 is interrupted, flow of water past nozzle 63 ceases. If at that time the levels of the two liquids in their containers are the same, there is no tendency for any liquid to flow past valves 44 and 61 in either direction. If flow of water due to pump 14 is greater than that supplied at conduit 21, the level in container 11 may momentarily be less than that in container 12, and flow of detergent liquid out of nozzle 63 through outer tube 60 of the mixer 13 would tend to occur. However, spring 56 has closed check valve 44 so no flow of detergent liquid toward the water container is possible.

The more likely situation when operation of pump 14 ceases is that the level in container 12 is below that of container 11, so that the hydrostatic head to the right of disk 65 is less than that to the left of the disk, and liquid flow toward container 12 takes place. The pressure difference is not great, and some resistance to flow is present, so the rate of flow is not great. Nevertheless, disk 65 is light, and it moves to the right as seen in FIG. 3. The disk movement is not as fast as the flow of liquid causing it, because of the erratic movement of the disk, but after a significant delay the disk 65 seats and flow of water toward the detergent container 12 ceases. The delay has, however, been sufficient to allow the liquids in the two containers to be brought more nearly to the same level, so that when pump operation is resumed the ratio of flow from the two containers to the pump 14 is that desired. The amount of detergent drawn from container 12 during an ordinary interval of pump operation is not great, so the change of level in container 12 is also not great.

While a float disk check valve has been shown at 61, it will be apparent that other check valve structures having inherent operating delays may also be used.

From the above it will be evident that the invention comprises an arrangement for delivering water and detergent liquid mixed in a predetermined ratio to a pump, the liquid supply to the pump being uninterrupted, and the level of detergent liquid being maintained by controlled admission of water from the mixer to the detergent container, while flow of detergent to the water container is prevented.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. Pressure cleaning apparatus for use with a nozzle, which comprises:
   a first container filled with primary liquid;
   a second container filled with secondary liquid;
   a relatively greater amount of primary liquid then secondary liquid being required during pressure cleaning;
   means for maintaining the primary liquid at a substantially constant predetermined level in said first container, said second container being filled initially to substantially the same liquid level;
   a pump located beneath said first and second containers, said pump having an inlet and an outlet connected to the nozzle;
   mixer means for mixing said primary and secondary liquids, said mixer means including a first inlet disposed between a second inlet and an outlet connected to the inlet of said pump;
   first spring-biased, normally closed check valve means connected between the first inlet of said mixer means and said first container for preventing backflow into said first container; and
   second free-floating check valve means disposed within said mixer means and connected between the second inlet of said mixer means and said second container for controlling backflow into said second container such that the level of secondary liquid therein tends to seek the same level as that of the primary liquid in said first container after operation of said pump.

2. The apparatus of claim 1, wherein said mixer means comprises:
   an outer tube having first and second ends and a lateral opening, the lateral opening corresponding to the first inlet and the second end corresponding to the outlet; and
   an inner tube extending into the first end of said outer tube past the lateral opening therein, said inner tube having a first end corresponding to the second inlet and a second terminal end.

3. The apparatus of claim 1, wherein said second check valve means comprises a floating disk check valve.

4. The apparatus of claim 1, further including:
   a metering valve connected between said second container and said second check valve means.

5. Pressure cleaning apparatus comprising, in combination:
   a pair of liquid containers at substantially the same level including a water container and a detergent container;
   means for replenishing and maintaining the liquid in said water container at a predetermined liquid level;
   a positive displacement pump located below said containers and having an inlet and an outlet, the outlet being connected to a nozzle; and
   means for supplying a mixture of water and detergent to said pump; comprising
   (a) an outer tube having first and second ends and a lateral inlet near said first end,
   (b) an inner tube projecting axially into said outer tube in sealed relation to said first end thereof, and having a first end extending past said lateral inlet,
   (c) first conduit means connecting said second end of said outer tube to said inlet of said pump,
   (d) second conduit means connecting said inner tube to the bottom of said detergent container,
   (e) third conduit means connecting said lateral inlet of said outer tube to the bottom of said water container,
   (f) first spring-biased, normally closed check valve means in said third conduit means for preventing backflow into said water container, and
   (g) second free-floating check valve means disposed in said inner tube between the ends of said outer tube which closes in delayed fashion for allowing controlled backflow such that the liquid level in said detergent container tends to equalize with the liquid level in said water container.

6. Apparatus according to claim 5 in which said second conduit means includes a metering valve.

7. Apparatus according to claim 5 in which said inner and outer tubes comprise an aspirator whereby the flow of water through said outer tube entrains liquid from said inner tube.

8. Apparatus according to claim 5 in which said inner tube is linearly adjustable in said outer tube.

9. Apparatus according to claim 5, wherein said second check valve means comprises a floating disk check valve.

10. Pressure cleaning apparatus for use with a nozzle, which comprises:
   a first container filled with primary liquid;
   a second container filled with secondary liquid;
   a relatively greater amount of primary liquid than secondary liquid being required during pressure cleaning;
   means for maintaining the primary liquid at a substantially constant predetermined level in said first container, said second container being filled initially to substantially the same liquid level;
   a pump located beneath said first and second containers, said pump having an inlet and an outlet connected to the nozzle;
   mixer means for mixing said primary and secondary liquids, said mixer means including a first inlet disposed between a second inlet and an outlet connected to the inlet of said pump;
   first spring-biased, normally closed check valve means connected between the first inlet of said mixer means and said first container for preventing backflow into said first container;
   second free-floating check valve means disposed within said mixer means and connected between the second inlet of said mixer means and said second container for controlling backflow into said second container such that the level of secondary liquid therein tends to seek the same level as that of the primary liquid in said first container after operation of said pump; and
   a metering valve connected between said second container and said second check valve means.

* * * * *